(12) United States Patent
Wu

(10) Patent No.: US 6,280,099 B1
(45) Date of Patent: Aug. 28, 2001

(54) OPTICAL FIBER WAVELENGTH FILTER AND MANUFACTURING METHOD FOR THE SAME

(75) Inventor: Yuying Wu, Matsudo (JP)

(73) Assignee: Seikoh Giken Co., Ltd., Matsudo (JP)

( * ) Notice: Subject to any disclaimer, the term of this patent is extended or adjusted under 35 U.S.C. 154(b) by 0 days.

(21) Appl. No.: 09/127,760

(22) Filed: Jul. 31, 1998

(30) Foreign Application Priority Data

May 12, 1998 (JP) .................................................. 10-128963

(51) Int. Cl.[7] ....................................................... G02B 6/38
(52) U.S. Cl. ................................................. 385/73; 385/70
(58) Field of Search .................................. 385/70, 72, 73, 385/97, 98

(56) References Cited

U.S. PATENT DOCUMENTS

| | | | |
|---|---|---|---|
| 5,208,886 | * 5/1993 | Clayton et al. .......................... | 385/73 |
| 5,234,772 | 8/1993 | Oguchi et al. ...................... | 428/473.5 |
| 5,706,379 | 1/1998 | Serafini et al. .......................... | 385/75 |
| 5,892,582 | * 4/1999 | Bao et al. .............................. | 356/345 |
| 6,002,819 | * 12/1999 | Saito et al. ............................. | 385/22 |

* cited by examiner

Primary Examiner—Darren Schuberg
(74) Attorney, Agent, or Firm—Venable; Gabor J. Kelemen

(57) ABSTRACT

An optical fiber wavelength filter which has superior optical properties and a manufacturing method for the same are disclosed. The optical fiber wavelength filter is composed of: a pair of glass ferrules which are transparent to ultraviolet rays and which are provided with optical fibers; and a thin dielectric multilayer film filter fixed between the distal ends of the ferrules. To manufacture the optical fiber wavelength filter, the optical fibers are bonded and secured to the pair of glass ferrules which are transparent to ultraviolet rays and the end surfaces thereof are ground. Then, the multilayer film filter and an adhesive agent which is hardened by the ultraviolet rays are disposed between the distal ends of the ferrules with the optical fibers, and the optical axes are aligned using a V-groove aligning jig. Upon completion of the optical axis alignment, ultraviolet rays are irradiated from outside to cure the adhesive agent to instantly fix the filter integrally to the distal ends of the pair of ferrules while the aligned ferrule are kept mounted on the V-grooved aligning jig.

7 Claims, 3 Drawing Sheets

OPTICAL FIBER WAVELENGTH FILTER AND MANUFACTURING METHOD FOR THE SAME

BACKGROUND OF THE INVENTION

1. Field of the Invention

The present invention relates to an optical fiber wavelength filter employed for selecting an optical wavelength in an optical fiber communication or an optical measurement system, and a manufacturing method for the same.

2. Description of the Related Art

The U.S. Pat. No. 5,706,379 has disclosed an optical fiber wavelength filter that employs a multilayer dielectric film filter formed on a glass substrate; FIG. 4 is a cross-sectional view showing the optical fiber wavelength filter.

Optical fibers 21 and 22 are inserted into ceramic ferrules 23 and 24 and bonded therein to prepare a pair of ground ferrules with optical fibers. Then, a glass substrate filter 25 composed of a glass substrate and a multilayer dielectric film formed on the surface thereof is placed between the foregoing pair of ferrules 23 and 24 with optical fibers, and the optical axes of the ceramic ferrules 23 and 24 are aligned using an aligning sleeve 26 before securing them with an adhesive agent.

This prior art has been posing a problem in that the use of the glass substrate filter 25, in which thickness t is normally a few hundred $\mu m$ ($\geqq 300 \mu m$), causes transmitted light to be refracted by the glass substrate or mode field diffusion to take place. The optical axis of the refracted light is inevitably displaced from the central axis of the ferrules.

The mechanical central axes of the ceramic ferrules with optical fibers are aligned by the inside diameter of the aligning sleeve and the misalignment of the optical axis of the transmitted light caused by the refraction can hardly be corrected. The results of the experiments carried out by the inventor have revealed that, when thickness t of the glass substrate filter is 300 $\mu m$, the measured value of the insertion loss is approximately 7 dB mainly due to the dislocated optical axis, or when the thickness is 500 $\mu m$, the insertion loss is approximately 9 dB. This means that it is difficult to control the insertion loss in this wavelength filter. In addition, a thermosetting adhesive agent is usually used in manufacturing the optical fiber wavelength filters employing the aforesaid aligning sleeves; this type of adhesive agent typically requires at least a few tens of minutes to completely harden.

The U.S. Pat. No. 5,234,772 has disclosed a dielectric multilayer film filter and a manufacturing method for the same. The optical fiber wavelength filter employs a filter composed of a dielectric multilayer film formed on a fluorinated polyimide thin film (hereinafter referred to as "thin-film filter"). The filter produced according to this process has an extremely thin wavelength filter owing to the use of the fluorinated polyimide thin film; hence, this filter is free from the deterioration in the optical properties resulting from the use of the thick glass substrate filter mentioned above.

FIG. 5 is a top plan view of an optical fiber wavelength filter employing the conventional thin-film filter; and FIG. 6 is a longitudinal sectional view of a wavelength filter employing the conventional thin-film filter.

Optical fibers 35 and 36 (the two optical fibers are not cut at the beginning) are secured to a substrate 30 by an adhesive agent. Then, the optical fibers are cut and a groove 31 is formed across, then a thin-film filter 32 is inserted in the groove 31 and secured therein by an adhesive agent. The U.S. patent has also disclosed an example wherein a zirconia ferrule is used in place of the substrate 30, optical fibers being attached and bonded thereto, and the zirconia ferrule or a stainless flange is provided with a groove wherein the thin-film filter is disposed.

It is necessary to provide the substrate 30, the substrate with optical fibers, the zirconia ferrule, or the like with the groove wherein the thin-film filter is disposed; it is not easy, however, to precisely form the groove having a width of about a few tens of $\mu m$. The variations in the machining dimension of the groove width directly affect the properties of the wavelength filter and lead to the variations in the optical properties such as insertion loss of the wavelength filter. Furthermore, the end surfaces of the optical fibers that are cut apart at the time of making the groove for holding the thin-film filter cannot be ground, so that the irregular reflection of light may take place on the connection end surfaces with consequent deterioration in optical properties.

Thus, the conventional optical fiber wavelength filters have many problems in the manufacturing process or optical properties.

SUMMARY OF THE INVENTION

Accordingly, the present invention has been made with a view toward solving the problems described above, and it is an object thereof to provide an optical fiber wavelength filter which is superior to the conventional ones described above in optical properties.

Another object of the present invention is to provide a manufacturing method for the optical fiber wavelength filter.

In order to achieve the above objects, there is provided an optical fiber wavelength filter comprising a pair of ferrules aligned each with other on a V-grooved support member, each having a distal end surface slanted at an angle predetermined with respect to the optical axis thereof, each one of which is composed of a material transparent to a light ray containing a particular wavelength component, a pair of optical fibers and the supported by said ferrules, wherein said and the distal end surfaces are grounded together with the end surfaces of said ferrules and polished at said predetermined angle, a thin dielectric multilayer film filter disposed between the polished distal end surfaces of said ferrules, and an adhesive agent put on the surfaces of said pair of ferrules and said thin dielectric multilayer film filter which is cured by irradiating said pair of ferrules and said dielectric multilayer film filter at the same time with a light ray containing said particular wavelength component while both said pair of ferrules and said dielectric multilayer film filter are kept mounted on said V-grooved support member, and is solidified thereat.

Said light ray containing said particular wavelength component is an ultraviolet ray, said adhesive agent is an ultraviolet-curing resin adhesive agent, and said pair of ferrules are glass ferrules which are kept mounted on said V-grooved support member while said adhesive agent is being cured.

Said thin multilayer film filter has a thickness of approximately 10 to 40 $\mu m$ including the substrate for forming said dielectric multilayer film, and the exterior of said multilayer film filter lies within the joint surface of said ferrules when it is bonded.

The distal ends of said ferrules are slant ground surfaces of 6 degrees or more.

There is also provided a manufacturing method for an optical fiber wavelength filter, comprising the steps of preparing a pair of ferrules aligned with each other on a V-grooved support member, each having a distal end surface slanted at an angle predetermined with respect to the optical axis thereof, each of which is composed of a material transparent to a light ray containing a particular wavelength component, bonding and securing optical fibers to said ferrules and grinding and polishing the distal end surfaces thereof at said predetermined angle, providing a thin multilayer film filter and an adhesive agent to be cured and hardened by a light ray containing said particular wavelength component, between the distal end surfaces of said ferrules, and performing optical axis alignment for said pair of ferrules on an optical axis aligning support member which supports said ferrules and permits the adjustment of relative positions among said pair of ferrules and said thin multilayer film filter, and irradiating said adhesive agent between the distal and surfaces of said pair of ferrules with a light ray containing said particular wavelength component from outside upon completion of said optical axis alignment until said pair of ferrules and said thin multilayer film filter are fastened to one piece.

Said light ray containing said particular wavelength component is an ultraviolet ray, said adhesive agent is an ultraviolet-curing resin adhesive agent, and said ferrules are glass ferrules which are kept mounted on said optical axis aligning support member while said adhesive agent is being cured.

Said pair of ferrules are the ferrules having substantially the same outside diameter and said optical axis aligning support member is a V-grooved support member which provides a common V-grooved surface to said pair of ferrules.

A portion corresponding to the joining position of said ferrules supported by said V-grooved support member is provided with a clearance groove.

The V-grooved matched to the joint position of the ferrules supported by the V-grooved support member is removed and a clearance groove is provided. This allows extra adhesive agent to be relieved, makes it easier to observe the joint condition, and permits ultraviolet rays to be irradiated sideways.

DESCRIPTION OF THE PREFERRED EMBODIMENTS

Figure 1:
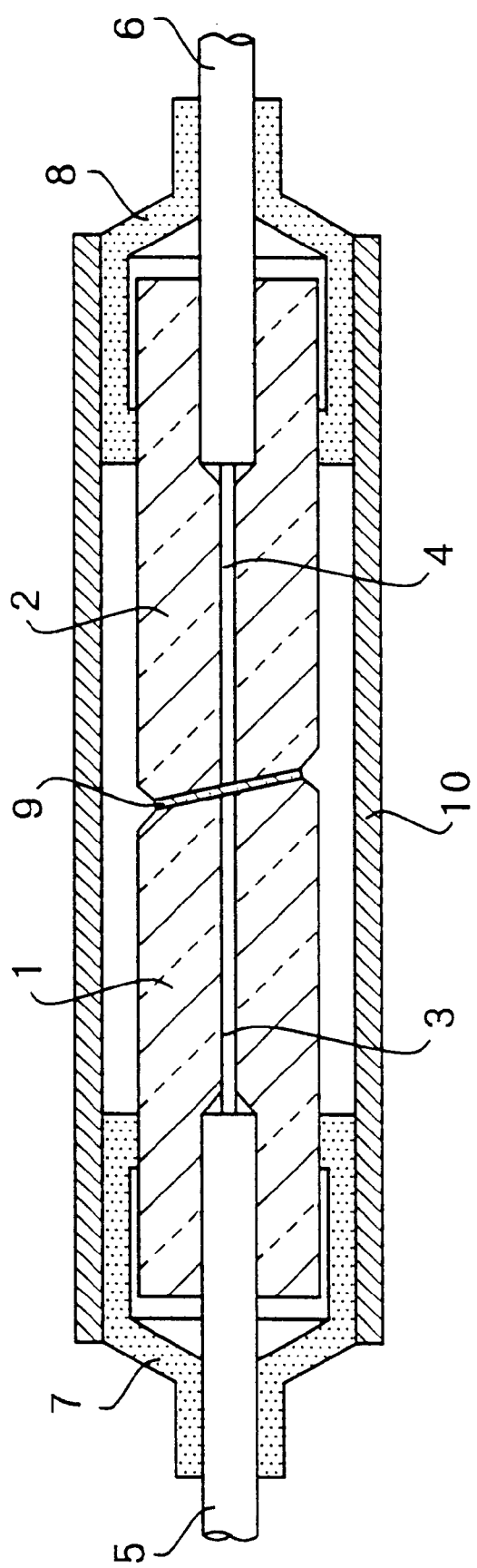
FIG. 1 is a longitudinal sectional view showing an embodiment of the optical fiber wavelength filter in accordance with the present invention.

An embodiment of the apparatus in accordance with the present invention will be described mainly with reference to the accompanying drawings. FIG. 1 is a longitudinal sectional view showing an embodiment of the optical fiber wavelength filter in accordance with the present invention.

The optical fiber wavelength filter in accordance with this embodiment is constituted by: a pair of glass ferrules 1 and 2 with optical fibers 3 and 4 of optical fiber cables 5 and 6; a thin-film filter 9; an adhesive agent (not shown) which has been hardened by ultraviolet rays; hoods 7 and 8; and a protective pipe 10.

The distal ends of the glass ferrules 1 and 2 have been ground with an angle of 6 degrees or more to minimize the feedback light attributable to Fresnel reflection at the boundary surface. The thin-film filter 9 may use the thin dielectric multilayer film filter, having a thickness of 10–40 $\mu$m including the substrate of polymide, manufactured by the method described above as the prior art. The filter may have any of the following wavelength properties: a short-wavelength type that passes light waves of short wavelengths, a long-wavelength type that passes those of long wavelengths, or a bandpass type that passes those of a particular wavelength.

The hoods 7 and 8 are made of rubber or plastics to provide resilience. The hoods 7 and 8 function to secure the roots of the glass ferrules with the optical fibers with respect to the protective pipe 10 in order to safety house the optical fiber wavelength filter in the protective pipe 10; they do not function to align optical axes. These hoods 7 and 8 also serve to protect the ferrule connections of the optical fiber cables 5 and 6. The protective pipe 10 uses a stainless pipe; it may, however, use a resinous pipe. Although the optical fiber wavelength filter shown as the embodiment has an extremely simple structure, it provides high performance in which the insertion loss is 0.5 dB or less and the return loss is 55 dB or more.

Figure 2:
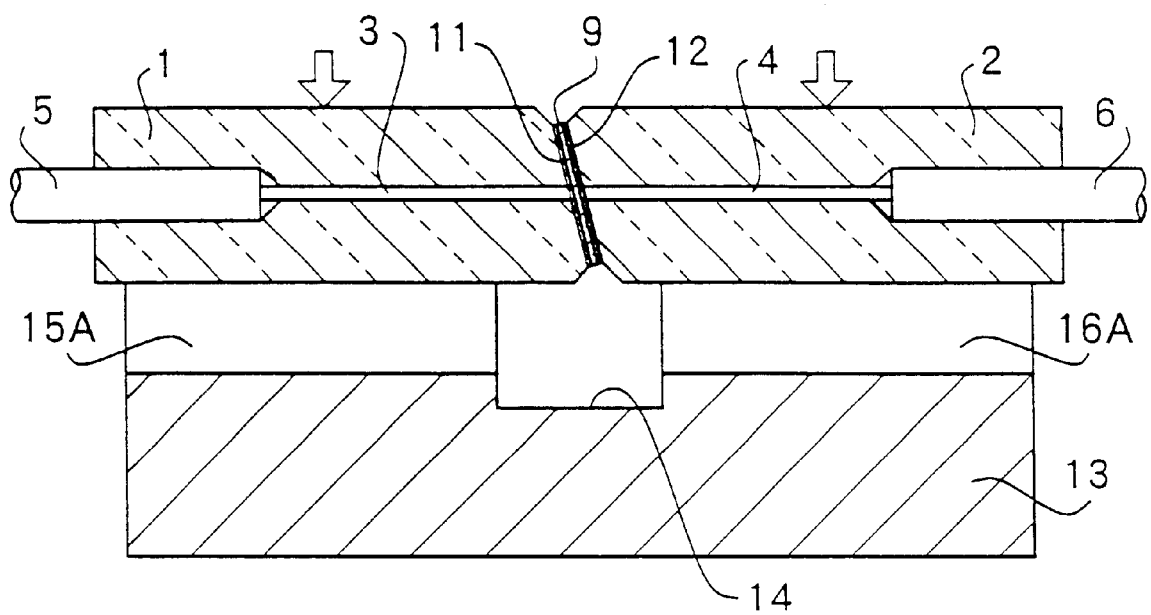
FIG. 2 is a longitudinal sectional view illustrating the manufacturing process of the embodiment.
Figure 3:
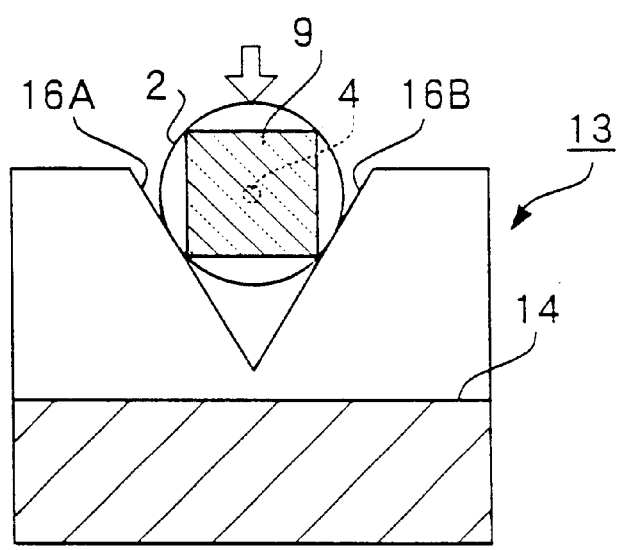
FIG. 3 is a cross-sectional view illustrating the manufacturing process of the embodiment.
Figure 4:
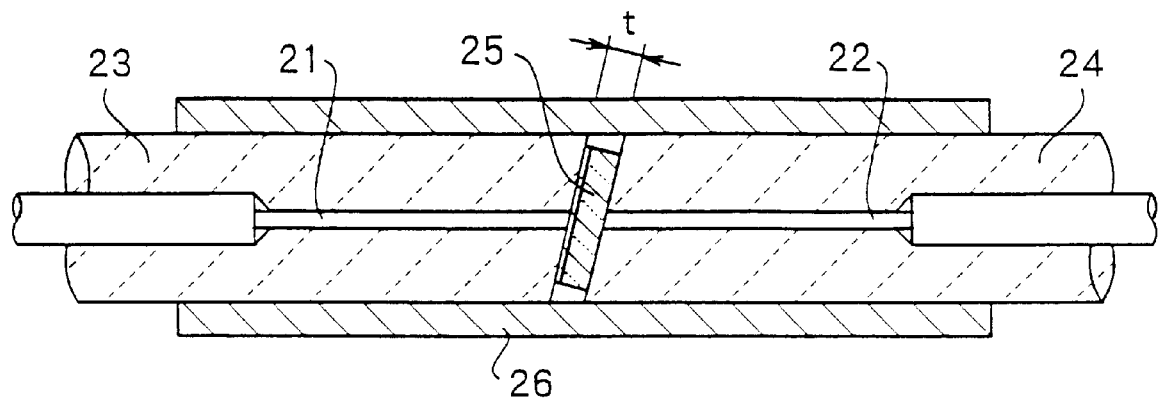
FIG. 4 is a longitudinal sectional view showing an optical fiber wavelength filter that employs a conventional glass plate.
Figure 5:
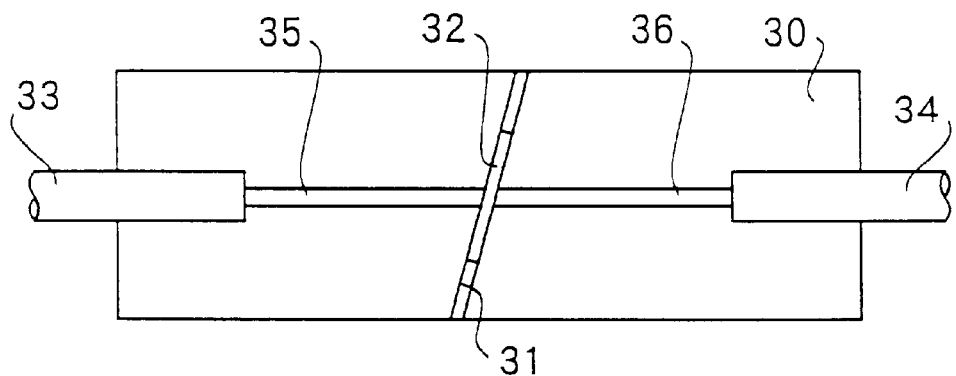
FIG. 5 is a top plan view showing an optical fiber wavelength filter that employs a conventional thin-film filter.
Figure 6:
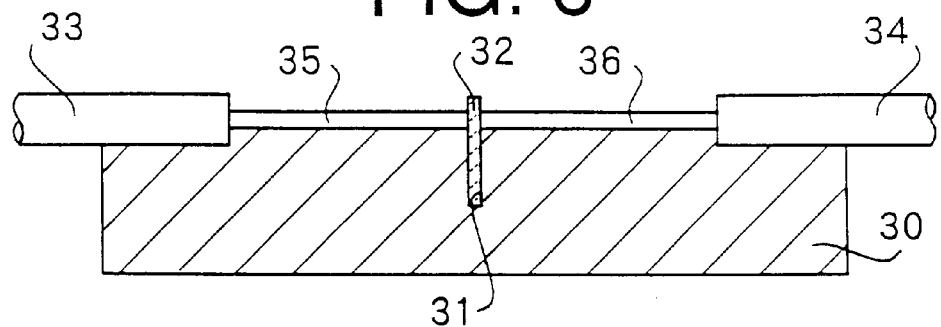
FIG. 6 is a longitudinal sectional view showing a wavelength filter that employs the conventional thin-film filter.

The manufacturing method for the embodiment of the optical fiber wavelength filter will now be described. FIG. 2 is a longitudinal sectional view illustrating the manufacturing process of the embodiment, and FIG. 3 is a cross-sectional view thereof.

Step for Preparing a Pair of Ferrules

A pair of ferrules is prepared; at least one of them is made of a material transparent to a light ray that includes a particular wavelength component. In this embodiment, the light ray which includes the particular wavelength component is an ultraviolet ray, and an ultraviolet-curing resin adhesive agent is used as the adhesive agent to make both glass ferrules 1 and 2 transparent to ultraviolet rays. Incidentally, the glass ferrules have the same outside diameter.

Polishing Step

The optical fiber cables 5 and 6 are inserted in and bonded to the ferrules 1 and 2 in such a manner that the optical fibers 3 and 4 at the distal ends thereof are exposed so that they may be ground. In this embodiment, the distal ends are ground with an angle.

Step for Aligning the Optical Axes

The ferrules with the optical fibers which have been ground are supported using a support member for aligning optical axes in order to align the optical axes of the optical fibers.

As the optical axis aligning support member, a V-groove support member 13 that provides a V-groove surface common to the pair of ferrules 1 and 2 is used; V-groove surfaces 15A and 16A are made flush, while V-groove surfaces 15B and 16B are made flush. The ferrule 1 is supported by the V-groove surfaces 15A and 15B, while the ferrule 2 is supported by the V-groove surfaces 16A and 16B. Under this condition, the thin multilayer film filter 9 and ultraviolet-curing resin adhesive agents 11 and 12 are disposed between the ferrules 1 and 2, and the optical axes are aligned while lightly pushing them from above as indicated by the arrows. The distal ends of the optical fibers are pressed into contact while pushing the ferrules in the direction indicated by the arrows in FIGS. 2 and 3, and one or both of the ferrules are turned to match the joint surfaces. The V-groove matched to the joint position of the ferrules 1 and 2 supported by the V-groove support member 13 is removed; instead, a clearance groove 14 is provided.

Providing the clearance groove 14 allows extra adhesive agent to be relieved, makes it easier to observe the joint condition, and permits ultraviolet rays to be irradiated sideways. A pair of adjustable stages with aligning V-grooves may be used instead of the aligning V-groove jig with the clearance groove 14 for relieving extra adhesive agent, and one or both of the stages may be three-dimensionally moved to achieve alignment with minimized insertion loss by making adjustment while measuring the properties of the optical fiber wavelength filter such as insertion loss by using an optical power meter.

Irradiating and Fixing Step

Upon completion of the optical axis alignment, ultraviolet rays are irradiated from outside to expose the adhesive agents between the pair of ferrules 1 and 2 to the ultraviolet rays so as to instantly fix the pair of ferrules 1 and 2 and the thin-film filter 9 into one piece. This completes the manufacture of the basic section of the optical fiber wavelength filter. The filter could be used as it is, or the hoods may be covered on both ferrules and housed in the protective pipe 10 as illustrated in FIG. 1.

It is apparent that widely different modifications of the embodiment which has been described in detail above can be formed on the basis of the present invention without departing from the spirit and scope of the invention. In the above embodiment, the distal ends of the ferrules have been ground with an angle; however, they may alternatively be ground at right angles. Even if ground surfaces of the ferrules may be spherical rather than plane, there should be no problem because the gap is filled with an adhesive agent for fixation.

Although both ferrules are transparent to ultraviolet rays in the embodiment, it is not required that both ferrules be transparent; at least one of them needs to be transparent because all that is necessary is to let sufficient light reach the joint surface to cure the adhesive agent.

Instead of using the rubber hoods in the embodiment shown in FIG. 1, the roots of the ferrules and the fiber cables may be wrapped with a heat-shrinkable tube and this assembly may be inserted and bonded in a protective pipe.

The optical fiber wavelength filter in accordance with the present invention has a simple construction and it permits easier optical axis alignment and easier manufacture.

Thus, the present invention makes it possible to provide a high-performance optical fiber wavelength filter at lower cost.

What is claimed is:

1. An optical fiber wavelength filter comprising:
   a pair of ferrules aligned with each other on a V-grooved support member, each having a distal end surface slanted at an angle predetermined with respect to the optical axis thereof, and each of which is composed of a material transparent to a light ray containing a particular wavelength component;
   a pair of optical fibers supported by said ferrules and having end surfaces, wherein said distal end surfaces of said optical fibers are ground together with the end surfaces of said ferrules and polished at said predetermined angle;
   a thin dielectric multilayer film filter disposed between the polished distal end surfaces of said ferrules; and
   an adhesive agent put on the surfaces of said pair of ferrules and said thin dielectric multilayer film filter, which is cured by irradiating said pair of ferrules and said dielectric multilayer film filter at the same time with a light ray containing said particular wavelength component, while both said pair of ferrules and said dielectric multilayer film filter are kept mounted on said V-grooved support member, and is solidified thereat.

2. An optical fiber wavelength filter according to claim 1, wherein said light ray containing said particular wavelength component is an ultraviolet ray, said adhesive agent is an ultraviolet-curing resin adhesive agent, and said pair of ferrules are glass ferrules which are kept mounted on said V-grooved support member while said adhesive agent is being cured.

3. An optical fiber wavelength filter according to claim 1, wherein said thin multilayer film filter has a thickness of approximately 10 to 40 $\mu$m including the substrate for forming said dielectric multilayer film, and the exterior of said multilayer film filter lies within the joint surfaces of said ferrules when it is bonded.

4. An optical fiber wavelength filter according to claim 1, wherein the distal ends of said ferrules are slant ground surfaces of 6 degrees or more.

5. A manufacturing method for an optical fiber wavelength filter, comprising the steps of:
   preparing a pair of ferrules aligned with each other on a V-grooved support member, each having a distal end surface slanted at an angle predetermined with respect to the optical axis thereof, each which is composed of a material transparent to a light ray containing a particular wavelength component;
   bonding and securing optical fibers to said ferrules, and grinding and polishing the distal end surfaces thereof at said predetermined angle;
   providing a thin multilayer film filter and an adhesive agent to be cured and hardened by a light ray containing said particular wavelength component, between the distal end surfaces of said ferrules, and performing optical axis alignment for said pair of ferrules on an optical axis aligning support member which supports said ferrules and permits the adjustment of relative positions among said pair of ferrules and said thin multilayer film filter; and
   irradiating said adhesive agent between the distal end surfaces of said pair of ferrules with a light ray containing said particular wavelength component from outside upon completion of said optical axis alignment until said pair of ferrules and said thin multilayer film filter are fastened to one piece.

6. A manufacturing method for an optical fiber wavelength filter according to claim 5, wherein said light ray containing said particular wavelength component is an ultraviolet ray, said adhesive agent is an ultraviolet-curing resin adhesive agent, and said ferrules are glass ferrules, which are kept mounted on said optical axis aligning support member while said adhesive agent is being cured.

7. A manufacturing method for an optical fiber wavelength filter according to claim 5, wherein said pair of ferrules are the ferrules having substantially the same outside diameter, and said optical axis aligning support member is a V-grooved support member which provides a common V-grooved surface to said pair of ferrules.

* * * * *